US012669447B2

(12) United States Patent
Kanai

(10) Patent No.: US 12,669,447 B2
(45) Date of Patent: Jun. 30, 2026

(54) ARTICLE INSPECTION APPARATUS

(71) Applicant: ANRITSU CORPORATION, Kanagawa (JP)

(72) Inventor: Takashi Kanai, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 140 days.

(21) Appl. No.: 18/903,092

(22) Filed: Oct. 1, 2024

(65) Prior Publication Data

US 2025/0116616 A1      Apr. 10, 2025

(30) Foreign Application Priority Data

Oct. 5, 2023    (JP) ................................. 2023-173480

(51) Int. Cl.
*G01N 23/04*        (2018.01)
*G01N 23/083*       (2018.01)
*G06T 7/00*         (2017.01)
(52) U.S. Cl.
CPC ........... *G01N 23/04* (2013.01); *G01N 23/083* (2013.01); *G06T 7/0002* (2013.01); *G01N 2223/3307* (2013.01); *G01N 2223/401* (2013.01); *G01N 2223/643* (2013.01); *G06T 2207/10116* (2013.01); *G06T 2207/20021* (2013.01); *G06T 2207/30168* (2013.01)
(58) Field of Classification Search
CPC ........ G01N 23/04; G01N 23/10; G01N 23/18; G01N 21/88; G01T 1/00; G01T 7/00;

G06T 5/00; G06T 5/20; G06T 5/50; G05B 13/02; G05B 19/042
See application file for complete search history.

(56) References Cited

U.S. PATENT DOCUMENTS

2010/0002835 A1*   1/2010   Kabumoto ............. G01N 23/04
                                                   378/207

FOREIGN PATENT DOCUMENTS

JP        2001-231779 A    8/2001
JP        2007-024835 A    2/2007
JP        2007-232586 A    9/2007

* cited by examiner

*Primary Examiner* — Courtney D Thomas
(74) *Attorney, Agent, or Firm* — McDonald Hopkins LLC

(57)            ABSTRACT

An article inspection apparatus includes a detection data output unit that incorporates a detection signal from an X-ray detector to output detection data, an image generation unit that generates an inspection image, based on the detection data, a level conversion processing unit that adjusts the detection data to improve image quality of the inspection image, when a specific inspection condition which deteriorates the image quality of the inspection image is established, and an inspection processing unit that performs inspection processing for inspecting a quality state of an article, based on inspection image data. When the specific inspection condition is established, the image generation unit generates the inspection image, based on the detection data adjusted by the level conversion processing unit, and the inspection processing unit performs the inspection processing, based on data of the inspection image.

14 Claims, 7 Drawing Sheets

| Transport speed [m/min] | Binning [M × N] | Transmittance 0% or higher and lower than 10% | Transmittance 10% or higher and lower than 30% | Transmittance 30% or higher and lower than 60% | Transmittance 60% or higher and lower than 100% |
|---|---|---|---|---|---|
| | | | Tube voltage[kV] | | |
| 10 ~ 19 | 1 × 1 | 70 kV | 60 kV | 50 kV | 30 kV |
| 20 ~ 39 | | 80 kV | 70 kV | 60 kV | 40 kV |
| 40 ~ 49 | 2 × 2 | 70 kV | 60 kV | 50 kV | 30 kV |
| 50 ~ 89 | | 80 kV | 70 kV | 60 kV | 40 kV |
| 90 ~ 99 | 4 × 4 | 70 kV | 60 kV | 50 kV | 30 kV |
| 100 ~ | | 80 kV | 70 kV | 60 kV | 40 kV |

FIG. 4

ARTICLE INSPECTION APPARATUS

The present invention relates to an article inspection apparatus, and more particularly relates to an article inspection apparatus that acquires image data corresponding to a dose distribution of radiation transmitted through a transported article by performing periodic detection operation of a line sensor type X-ray detector, and determines a quality state of an inspection object article, based on the image data.

BACKGROUND ART

As an article inspection apparatus that inspects a quality state of an article such as a food, for example, the presence or absence of a contained foreign substance, a defect, an internal shape, or the like, an article inspection apparatus is known as follows. An article during transportation is irradiated with radiation which can be transmitted through the article, for example, an X-ray. The radiation transmitted through the transported article is detected by performing a periodic detection operation (main scanning) of a line sensor, and image data is acquired. A quality state of an inspection object article is determined, based on a predetermined image processing result for the image data.

In addition, in an article inspection apparatus using an X-ray inspection method, inspection processing is performed as follows. Logarithmic conversion processing on gradation density data corresponding to sensitivity of human eyes, image filter processing for reducing noise to determine a quality state of an inspection object article, image filter processing for preventing erroneous determination by emphasizing a foreign subject property, and the like are applied as necessary to transmission X-ray image data including physical property information of an inspection object. Furthermore, threshold value processing is applied to determine the presence or absence of a contained foreign substance.

As the article inspection apparatus of this type in the related art, for example, there is provided an article inspection apparatus that stores an X-ray image obtained during settings associated with article type information of an inspection object article in a memory in a form of a compressed image or the like. The article inspection apparatus visually easily recognizes an article of an article type to be selected during an article type selection inspection, or easily collate and determine a set article type including an inspection condition (for example, refer to Patent Document 1).

In this apparatus, when operation conditions of X-ray detection means and an X-ray image generation unit are set for each type of inspection object articles, an X-ray image generated by the X-ray image generation unit is stored as X-ray image information during the settings in association with setting information for each article type, for example, an article type number, an article name, the number of contents, a weight, a shape, a tube current, a tube voltage, a transport speed, a determination threshold value, a mask processing condition, and the like.

RELATED ART DOCUMENT

Patent Document

[Patent Document 1] JP-A-2007-232586

DISCLOSURE OF THE INVENTION

Problem that the Invention is to Solve

However, in the article inspection apparatus as described above, the following problems have become apparent due to not only improvement of inspection performance, but also an increasing demand for energy saving or a longer life.

That is, when the X-ray generator needs to increase an article transport speed to meet a demand for improvement in productivity, and needs to reduce an output of the X-ray generator to meet the demand for the energy saving or the longer life, an output level of a detection signal of a line sensor is lowered.

For example, in a scintillator type line sensor, when a scanning period is shortened to ensure required image resolution in response to an increase in the article transport speed, the amount of X-rays transmitted through each detection object site which reaches to the scintillator is reduced, compared to the amount when the article is transported in a low-speed region. Accordingly, the amount of scintillation light received by a photodiode decreases, and a detection signal level of each detection element of the line sensor (range of an output of a detection element (dynamic range)) is reduced. Consequently, density resolution of an X-ray image significantly deteriorates.

In addition, there is also a problem in that spatial resolution of the X-ray image deteriorates, such as when image blurring occurs since afterglow of the scintillator overlaps a detection signal of a subsequent period in a scanning period of the line sensor corresponding to an increase in the transport speed due to afterglow characteristics of the scintillator.

Therefore, in the article inspection apparatus in the related art, in some cases, density distribution in which the X-ray image can be appropriately processed cannot be achieved in a high-speed region of the transport speed. Consequently, there is a possibility that a satisfactory inspection with ensured accuracy and reliability cannot be performed.

The present invention is made to solve the above-described problems in the related art, and an object of the present invention is to provide an article inspection apparatus that can perform a satisfactory inspection by effectively suppressing a significant influence of a decrease in a detection signal level of a line sensor in a high transport speed region or the like which is a specific inspection condition, while increasing an article transport speed and reducing an output of an X-ray generator.

Means for Solving the Problem

According to a first aspect of the present invention, in order to achieve the above-described object, there is provided an article inspection apparatus including an article transport unit having a transport path for transporting an inspection object article at a predetermined transport speed, a radiation source that irradiates the inspection object article inside a predetermined section on the transport path with radiation, a radiation detection unit having a plurality of detection elements facing the radiation source across the transport path, causing the plurality of detection elements to sequentially detect the radiation transmitted through the inspection object article, and outputting respective detection signals, a detection data output unit that incorporates the respective detection signals from the radiation detection unit at a predetermined period, and that outputs detection data for generating a radiation image of the inspection object article, an image generation unit that generates an inspection image including a plurality of pixels having respective density values, based on the detection data output from the detection data output unit, specific inspection condition detection means for detecting that a specific inspection condition which deteriorates image quality of the inspection image is established, image data adjustment means for adjusting the detection data output from the detection data output unit to improve the image quality of the inspection image, when the specific inspection condition detection means detects that the specific inspection condition is established, and an inspection processing unit that performs inspection processing for inspecting a predetermined quality state of the inspection object article, based on data of the inspection image of the inspection object article which is generated by the image generation unit.

According to this configuration, when the specific inspection condition detection means detects that the specific inspection condition which deteriorates the image quality of the inspection image is established, the detection data output from the detection data output unit is adjusted to improve the image quality of the inspection image by the image data adjustment means. In this manner, the image generation unit can generate the inspection image in which a range of the density value of the plurality of pixels is expanded, based on the adjusted detection data adjusted by the image data adjustment means, and the inspection processing unit performs the inspection processing, based on data of the inspection image in which the range of the density value is expanded. Therefore, even when the article transport speed is increased or for example, even when the radiation is emitted as the X-ray to reduce the output of the X-ray generator, it is possible to perform satisfactory article inspection processing while effectively suppressing the influence of the decrease in the signal level of the detection signal incorporated from an X-ray detector to the detection data output unit for each predetermined scanning period.

In this case, since a signal level of each of the detection signals output from a plurality of X-ray detection elements of the X-ray detector is changed in accordance with a dose of the X-rays incident on each of the detection elements. Therefore, the signal level is applied to the detection data output from the detection data output unit. In addition, the adjustment to improve the image quality of the inspection image typically includes performing processing for improving a value of a signal-to-noise ratio (S/N) of the detection data such that a range (dynamic range) of the density value of the inspection image can be expanded. However, the adjustment may mean processing for reducing noise components.

In addition, for example, the specific inspection condition referred to here is a condition that an irradiation intensity of the radiation from the radiation source to the inspection object article is insufficient, or a condition that the transport speed of the inspection object article is high and an irradiation time of the radiation is insufficient. In addition, the adjustment performed by the image data adjustment means when the specific inspection condition is established corresponds to processing for functionally adjusting brightness of the image in accordance with a light exposure amount (irradiation time and irradiation intensity of the radiation), such as gain adjustment of a digital camera, and can be the binning processing or kernel filtering (filter processing), for example. A radiation detector is not limited to a detector having one row in which detection element rows of the radiation are aligned in a main scanning direction, and may be a detector having a plurality of rows aligned in the main scanning direction while being adjacent to each other in a sub-scanning direction.

As the article inspection apparatus according to a second aspect of the present invention, in the article inspection apparatus according to the first aspect, a configuration may be adopted as follows. The detection data is radiation image data having a density value based on the respective detection signals for a plurality of pixels of the radiation image. The image data adjustment means causes the inspection image to have required image quality by performing image processing (for example, binning processing, kernel filtering, or the like) for converting each pixel group of a predetermined number of adjacent pixels in the radiation image into one pixel. In this manner, inspection processing for a satisfactory article inspection can be performed by ensuring required image quality of the inspection image.

As the article inspection apparatus according to a third aspect of the present invention, in the article inspection apparatus according to the first aspect, the specific inspection condition may include a condition that a transport speed of the inspection object article passing through a predetermined section on the transport path reaches or exceeds a predetermined speed, or a condition that an irradiation intensity of the radiation emitted from the radiation source to irradiate the inspection object article is reduced to be lower than a predetermined intensity. In this case, when the signal level of the detection signal incorporated into the detection data output unit from the radiation detector for each predetermined scanning period is lowered since the transport speed enters a specific high-speed region or the irradiation intensity of the radiation is reduced to be lower than the predetermined intensity, the detection data output from the detection data output unit is adjusted to improve the image quality of the inspection image by the image data adjustment means. Therefore, the inspection processing of the satisfactory article inspection can be performed by ensuring the required image quality of the inspection image.

As the article inspection apparatus according to a fourth aspect of the present invention, in the article inspection apparatus according to the second aspect, the specific inspection condition may include a condition that a transport speed of the inspection object article passing through a predetermined section on the transport path reaches or exceeds a predetermined speed, or a condition that an irradiation intensity of the radiation emitted from the radiation source to irradiated the inspection object article is reduced to be lower than a predetermined intensity. In this case, when the signal level of the detection signal incorporated into the detection data output unit from the radiation detector for each predetermined scanning period is lowered since the transport speed enters a specific high-speed region or the irradiation intensity of the radiation is reduced to be lower than the predetermined intensity, the detection data output from the detection data output unit is adjusted to improve the image quality of the inspection image by the image data adjustment means. Therefore, the inspection processing of the satisfactory article inspection can be performed by ensuring the required image quality of the inspection image.

As the article inspection apparatus according to a fifth aspect of the present t invention, in the article inspection apparatus according to the first aspect, the specific inspection condition may include a condition that a transmittance of the inspection object article in a transmission direction of the radiation is within a low transmittance range of a plurality of transmittance ranges set in advance. In this case, when the transmittance of the inspection object article enters the low transmittance range, the detection data output from the detection data output unit is adjusted to improve the image quality of the inspection image by the image data adjustment means. Therefore, the inspection processing of the satisfactory article inspection can be performed by ensuring the required image quality of the inspection image.

As the article inspection apparatus according to a sixth aspect of the present invention, in the article inspection apparatus according to the second aspect, the specific inspection condition may include a condition that a transmittance of the inspection object article in a transmission direction of the radiation is within a low transmittance range of a plurality of transmittance ranges set in advance. In this case, when the transmittance of the inspection object article enters the low transmittance range, the detection data output from the detection data output unit is adjusted to improve the image quality of the inspection image by the image data adjustment means. Therefore, the inspection processing of the satisfactory article inspection can be performed by ensuring the required image quality of the inspection image.

As the article inspection apparatus according to a seventh aspect of the present invention, the article inspection apparatus according to the first aspect further includes sensitivity decrease detection means for detecting a significant decrease state of a detection sensitivity of the radiation detection unit. The specific inspection condition may include a condition that the significant decrease state of the detection sensitivity is detected by the sensitivity decrease detection means. In this case, when the significant decrease state of the detection sensitivity of the radiation detector is detected by the sensitivity decrease detection means, the detection data output from the detection data output unit is adjusted to improve the image quality of the inspection image by the image data adjustment means. Therefore, the inspection processing of the satisfactory article inspection can be performed by ensuring the required image quality of the inspection image.

As the article inspection apparatus according to an eighth aspect of the present invention, the article inspection apparatus according to the second aspect further includes sensitivity decrease detection means for detecting a significant decrease state of a detection sensitivity of the radiation detection unit. The specific inspection condition may include a condition that the significant decrease state of the detection sensitivity is detected by the sensitivity decrease detection means. In this case, when the significant decrease state of the detection sensitivity of the radiation detector is detected by the sensitivity decrease detection means, the detection data output from the detection data output unit is adjusted to improve the image quality of the inspection image by the image data adjustment means. Therefore, the inspection processing of the satisfactory article inspection can be performed by ensuring the required image quality of the inspection image.

As the article inspection apparatus according to a ninth aspect of the present invention, in the article inspection apparatus according to the second aspect, a configuration may be adopted as follows. The specific inspection condition is established when any one of a first specific transport condition in which a transport speed of the inspection object article passing through a predetermined section on the transport path is equal to or higher than a first transport speed equal to a predetermined speed and is lower than a second transport speed higher than the first transport speed, and a second specific transport condition that is a high transport speed region which is equal to or higher than the second transport speed is established. The image data adjustment means adjusts the detection data of the inspection object article such that an adjustment amount of the detection data of the inspection object article increases when the specific inspection condition detection means detects that the second specific transport condition is set, compared to when the specific inspection condition detection means detects that the first specific transport condition is set. In this way, when any one of the first and second specific transport conditions is established, that is, when any one of the plurality of specific transport conditions set in stages is established, the adjustment amount of the detection data of the inspection object article is changed in accordance with a stage of the condition. Therefore, a decrease in the signal level of the detection signal in the high-speed transport region is more effectively suppressed.

As the article inspection apparatus according a tenth aspect of the present invention, in the article inspection apparatus according to the second aspect, a configuration may be adopted as follows. The image data adjustment means adjusts the detection data of the inspection object article by performing binning processing in which image data of each small region is used as a unit, when an X-ray image of the inspection object article is divided into a plurality of small regions. In this case, image reduction that suppresses an information loss caused by pixel thinning can be performed. Therefore, even when the article transport speed is increased or for example, even when the radiation is emitted as the X-ray to reduce the output of the X-ray generator, satisfactory article inspection processing can be performed by effectively suppressing the influence of the decrease in the signal level of the detection signal incorporated into the detection data output unit from the X-ray detector.

As the article inspection apparatus according to an eleventh aspect of the present invention, in the article inspection apparatus according to the fifth aspect, a configuration may be adopted as follows. The image data adjustment means has an automatic setting function of calculating the transmittance of the inspection object article, based on an image density ratio inside and outside an image region of the inspection object article in the detection data, and of performing variable setting on a radiation irradiation condition of the radiation source in accordance with a calculation value of the transmittance, when the detection data of the inspection object article is acquired by the detection data output unit. In this case, an output condition of radiation irradiation from the radiation source, for example, a tube voltage of an X-ray tube can be automatically set in accordance with a calculation value of the transmittance. Therefore, even in a case of the inspection object article whose radiation transmittance is a low transmittance, the decrease in the signal level of the detection signal is more effectively suppressed.

As the article inspection apparatus according a twelfth aspect of the present invention, in the article inspection apparatus according to the sixth aspect, a configuration may be adopted as follows. The image data adjustment means has an automatic setting function of calculating the transmittance of the inspection object article, based on an image density ratio inside and outside an image region of the inspection object article in the detection data, and of performing variable setting on a radiation irradiation condition of the radiation source in accordance with a calculation value of the transmittance, when the detection data of the inspection object article is acquired by the detection data output unit. In this case, an output condition of radiation irradiation from the radiation source, for example, a tube voltage of an X-ray tube can be automatically set in accordance with a calculation value of the transmittance. Therefore, even in a case of the inspection object article whose radiation transmittance is a low transmittance, the decrease in the signal level of the detection signal is more effectively suppressed.

As the article inspection apparatus according to a thirteenth aspect of the present invention, in the article inspection apparatus according to the ninth aspect, a configuration may be adopted as follows. The radiation source is an X-ray generator having an X-ray tube. A tube voltage of the X-ray tube is controlled to a voltage value different from a voltage value in other transport speed ranges in a specific transport speed range before switching or after switching between the first specific transport condition and the second specific transport condition. In this case, a transmission amount of the radiation can be adjusted by controlling the tube voltage of the X-ray tube in a specific transport speed range before switching or after the switching between the first specific transport condition and the second specific transport condition, and the influence of the decrease in the signal level of the detection signal before and after the switching between the transport conditions can be effectively alleviated.

As the article inspection apparatus according to a fourteenth aspect of the present invention, in the article inspection apparatus according to the tenth aspect of the present invention, a configuration may be adopted as follows. The radiation source is an X-ray generator. The article inspection apparatus further includes an X-ray line sensor camera including the radiation detection unit, the detection data output unit, and an image processing circuit for performing the binning processing. According to this configuration, it is possible to reduce load of preprocessing on an image processing circuit side.

Advantage of the Invention

According to the present invention, it is possible to provide an article inspection apparatus that can perform a satisfactory inspection by effectively suppressing an influence of a decrease in a detection signal level of a line sensor in a high transport speed region or the like which is a specific inspection condition, while increasing an article transport speed and reducing an output of an X-ray generator.

BRIEF DESCRIPTION OF THE DRAWINGS

FIG. 4 is a setting table showing a guide as an example when a tube voltage of an X-ray source is set in accordance with an X-ray transmittance in addition to a binning processing condition of X-ray image data to be set in accordance with a transport speed of an inspection object article in the article inspection apparatus according to the first embodiment of the present invention, and can be used when the tube voltage is automatically set.

BEST MODE FOR CARRYING OUT THE INVENTION

Hereinafter, embodiments according to the present invention will be described with reference to the drawings.

First Embodiment

FIGS. 1 to 6 are views showing an article inspection apparatus according to a first embodiment of the present invention.

First, a configuration thereof will be described.

Figure 1:
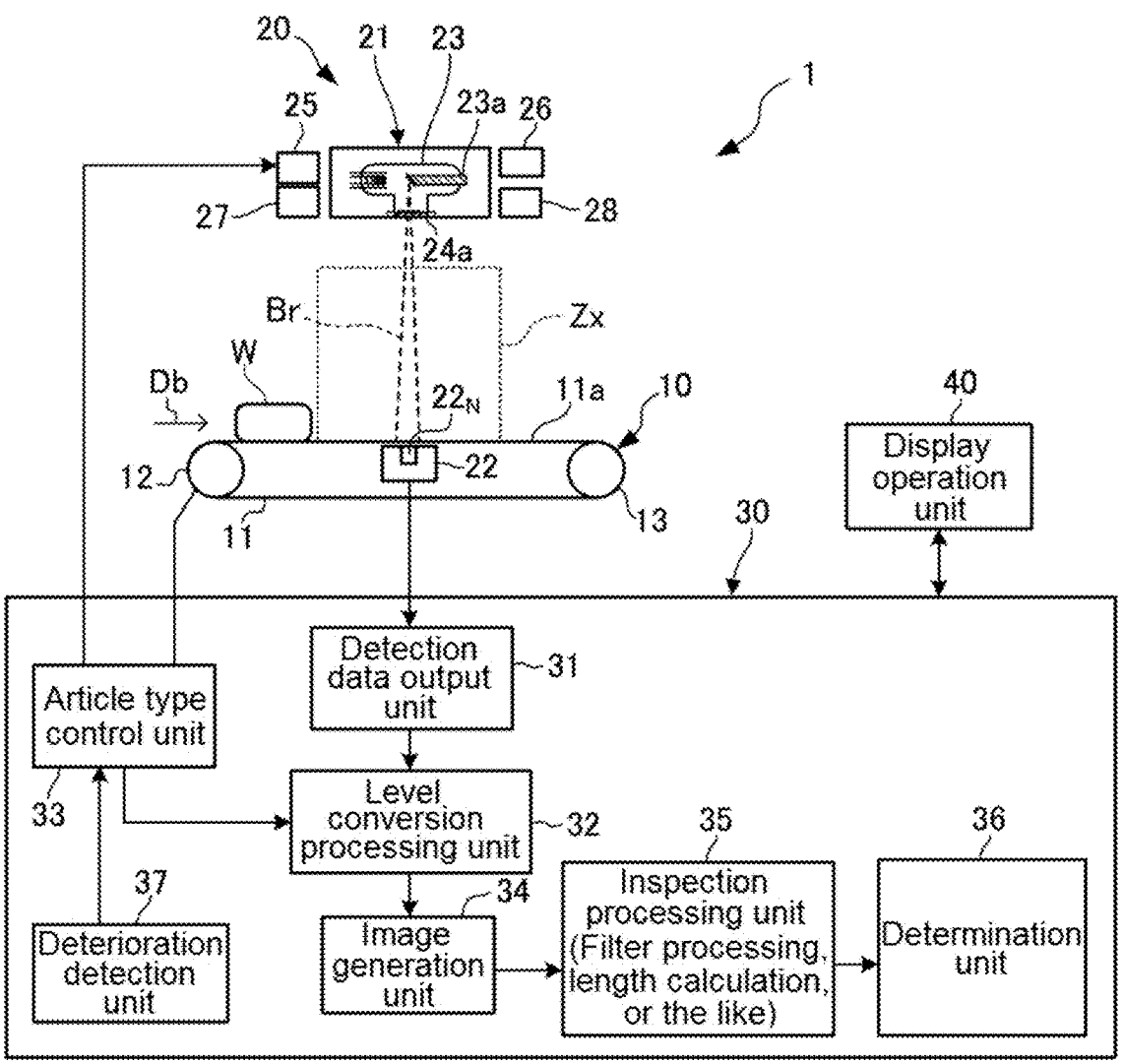
FIG. 1 is a schematic configuration diagram showing an article inspection apparatus according to a first embodiment of the present invention.

As shown in FIG. 1, an article inspection apparatus 1 according to the first embodiment of the present invention includes an article transport unit 10, an X-ray inspection unit 20, a control unit 30, and a display operation unit 40, and forms a part of an article inspection system in which a sorting device (not shown) or the like is provided in combination in a rear stage of the article transport unit 10.

The article inspection apparatus 1 is an apparatus that inspects an inspection object article W with radiation which can be transmitted through the inspection object article W, for example, such as an X-ray, and has a foreign substance detection function which can determine whether or not a foreign substance is contained in the inspection object article W with the X-ray. The article inspection apparatus 1 may have a function such as a defect inspection, a mass inspection, a shape inspection of the inspection object article, such as a thickness and a length, a packaging defect detection, such as a content bitten into a sealing portion, or the like, instead of the foreign substance detection. In addition, the radiation is not limited to the X-ray.

The article transport unit 10 of the article inspection apparatus 1 is configured such that a belt 11 is hung in a loop shape between a pair of parallel rollers 12 and 13, and the inspection object article W can be transported in a predetermined transport direction Db by a transport path 11a which is an upper running portion of the belt 11. In addition, the article transport unit 10 includes a transport drive motor (not shown) that rotationally drives any one of the rollers 12 and 13 at a variable setting speed such that the belt 11 advances at a predetermined transport speed, an encoder for detecting a rotation speed of the transport drive motor, and the like. Furthermore, the predetermined transport speed at which the article transport unit 10 transports the inspection object article W is set in advance as a part of article type setting information in accordance with an article type of the inspection object article W (for example, in accordance with an X-ray transmittance (to be described later)) when the article type of the inspection object article W is registered. Here, as a matter of course, a belt conveyor is used, but the inspection object article W may be moved in the predetermined transport direction Db by a conveyor of another type.

The X-ray inspection unit 20 of the article inspection apparatus 1 includes an X-ray generator 21 (radiation source) that irradiates the inspection object article W passing through the inside of a predetermined inspection region Zx which is a predetermined section on the transport path 11a with the X-ray, and a line sensor type X-ray detector 22 (radiation detection unit) that detects a dose of the X-ray transmitted through the inspection object article W (hereinafter, referred to as an X-ray transmission amount).

The X-ray generator 21 is an X-ray irradiation unit that irradiates the inspection object article W moving in the inspection region Zx on the transport path 11a of the article transport unit 10 at a predetermined transport speed, with the X-ray which is the radiation.

For example, the X-ray generator 21 includes an X-ray tube 23 inside a metal housing body 24, and has configuration in which the X-ray tube 23 is immersed in insulating oil (not shown) for cooling inside the housing body 24. In addition, although a detailed structure is omitted in the description, for example, the X-ray tube 23 causes electrons emitted from a filament on a cathode side inside an outer casing and converged by a converging electrode to collide with a target on an anode side facing the filament, and generates the X-ray from the target. The X-ray generator 21 may combinedly have a collimator that limits an irradiation field of the X-ray to a predetermined shape.

The X-ray tube 23 is disposed such that a longitudinal direction thereof is substantially parallel to the predetermined transport direction Db, and the X-ray generated by the X-ray tube 23 in the X-ray generator 21 is emitted downward from an X-ray window portion 24a on a bottom side of the housing body 24 in a direction orthogonal to the transport direction. The anode of the X-ray tube 23 may be a fixed type or a rotating type.

Figure 2:
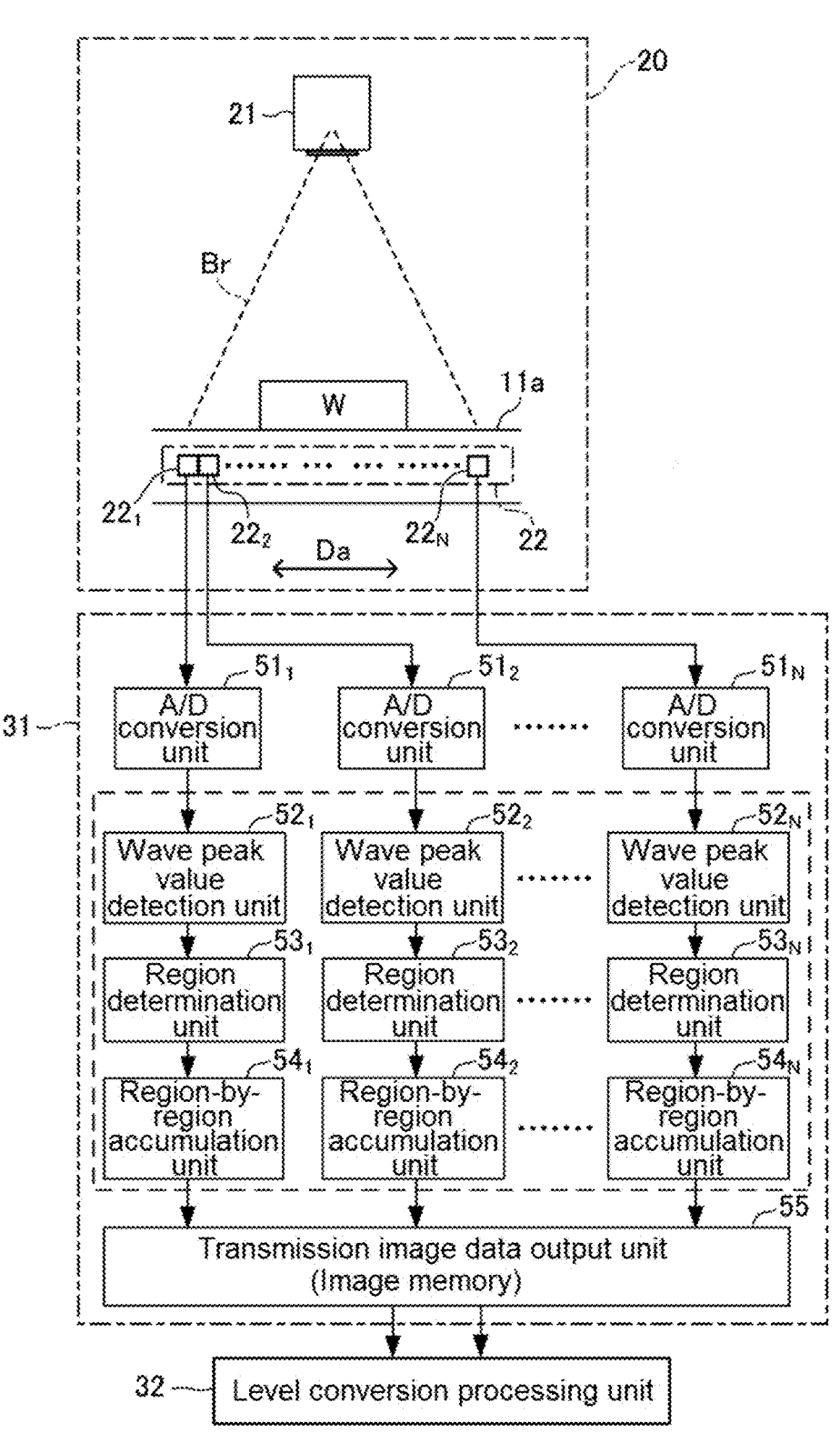
FIG. 2 is a view for describing a sensor configuration of an X-ray detector and a circuit configuration of a transmission image data generation unit in the article inspection apparatus according to the first embodiment of the present invention.

The X-ray generator 21 including the X-ray tube 23 irradiates the inspection object article W with an X-ray beam Br having a predetermined beam shape directed in a direction orthogonal to the predetermined transport direction Db, for example, a fan beam shape as shown by a broken line in FIGS. 1 and 2, at a predetermined position in the transport direction of the article transport unit 10. In this manner, the X-ray generator 21 irradiates the inspection object article W passing through the inside of the detection region Zx with the X-ray at irradiation intensity within a predetermined range, and causes the X-ray transmitted through the inspection object article W to be incident on the line sensor type X-ray detector 22.

In addition, the X-ray generator 21 includes driving power supply circuits 25 and 26 that drive the X-ray tube 23 in a state where the X-ray can be generated. One driving power supply circuit 25 applies a potential corresponding to a predetermined operating voltage to the converging electrode on the cathode side of the X-ray tube 23, and applies a predetermined lighting voltage for providing thermionic emission energy to the filament on the cathode side. The other driving power supply circuit 26 applies a positive potential corresponding to an anode voltage during a high-voltage operation to an anode 23a of the X-ray tube 23.

The X-ray detector 22 of the X-ray inspection unit 20 includes a plurality of X-ray detection elements $22_1$ to $22_N$ (detection elements) that each receive the X-ray and convert the X-ray into an electrical signal, and performs a detection operation, that is, main scanning in which each of the plurality of X-ray detection elements $22_1$ to $22_N$ detects the X-ray transmitted through the inspection object article W in the X-rays emitted from the X-ray generator 21 toward the inspection object article W at a predetermined period.

As shown in FIG. 2, the X-ray detector 22 includes a single X-ray line sensor in which the plurality of X-ray detection elements $22_1$ to $22_N$ are integrally connected, is disposed on a lower side of the transport path 11a inside the loop-shaped belt 11 of the article transport unit 10, and causes the plurality of X-ray detection elements $22_1$ to $22_N$ to face the radiation source 21. Here, for example, when each sensor width of the plurality of X-ray detection elements $22_1$ to $22_N$ in a direction Da is set to 1 mm and a gap between the sensors is set to be small to a negligible extent with respect to the sensor width, and the width in a width direction (direction Da in the drawing) of the transport path 11a for transporting the inspection object article W is set to 200 mm, a line sensor having approximately 200 sensors may be used.

In addition, the plurality of X-ray detection elements $22_1$ to 22 of the X-ray detector 22 output the detection signals having a signal level (wave peak value) corresponding to the transmission amount of the X-ray transmitted through the inspection object article W. Therefore, the detection data generated and output by the detection data output unit 31 is transmission image data, and represents density of a transmission image corresponding to the wave peak value of the detection signal output by each of the X-ray detection elements $22_1$ to $22_N$ per unit time. The plurality of X-ray detection elements $22_1$ to $22_N$ may be a scintillator type detection element, or may be a photon detection type detection element.

Although the detailed configuration is omitted in the drawing, for example, the control unit 30 is realized by a combination of hardware such as a central processing unit (CPU), a random access memory (RAM), or the like, and software such as a program or the like that fulfills various functions on the hardware. The hardware referred to here may include a field programmable gate array (FPGA), a digital signal processor (DSP), or the like. In addition, various functions referred to here are functions of the following plurality of function units performing acquiring and outputting detection data which can generate the X-ray image of the inspection object article W, generating the inspection image data, controlling predetermined inspection processing and a display output, and the like.

As shown in FIG. 1, as the plurality of function units that fulfills the above-described various functions, the control unit 30 includes a detection data output unit 31, a level conversion processing unit 32 (image data adjustment means), an article type control unit 33 (specific inspection condition detection means), an image generation unit 34, an inspection processing unit 35 (inspection image processing means), a determination unit 36, and a deterioration detection unit 37 (specific inspection condition detection means), and performs controlling a predetermined article inspection, display output, and the like on the inspection object article W, based on article type information and various detection information which are set in advance in the article type control unit 33.

Specifically, the detection data output unit 31 incorporates the detection signal output from the X-ray detector 22 of the X-ray inspection unit 20, that is, the detection signal from each of the plurality of X-ray detection elements $22_1$ to $22_N$ at a predetermined period, and outputs the detection data which can generate two-dimensional X-ray image data of the inspection object article W.

That is, the detection data output unit 31 incorporates the detection signals from the plurality of X-ray detection elements $22_1$ to $22_N$ of the X-ray detector 22 for each predetermined time, during a period in which the inspection object article W passes between the X-ray generator 21 and the X-ray detector 22 (predetermined position in the transport direction), performs the other predetermined signal processing such as A/D conversion (to be described later), and outputs the detection data from the transmission image data output unit 55 for each predetermined period from the plurality of X-ray detection elements $22_1$ to $22_N$.

The signal level (wave peak value) of each detection signal output from the plurality of X-ray detection elements $22_1$ to $22_N$ is changed in accordance with the dose of the X-ray incident on each of the X-ray detection elements $22_1$ to $22_N$. Therefore, the signal level is applied to the detection data output from the detection data output unit 31.

As shown in FIG. 2, the detection data output unit 31 includes A/D conversion units $51_1$ to $51_N$ to which the X-ray detection signals in the Direction Da from the plurality of X-ray detection elements $22_1$ to $22_N$ of the X-ray detector 22 are input, and a transmission image data output unit 55 that generates and outputs the transmission image data of the line image corresponding to the scan time, based on a position of a detection width region in the Direction Da from the plurality of X-ray detection elements $22_1$ to $22_N$ and an elapsed time during the scan time, based on the output signals of the A/D conversion units $51_1$ to $51_N$ which are output in a predetermined calculation period.

In a case of the scintillator type detection element, the outputs of the A/D conversion units $51_1$ to $51_N$ are directly connected to the transmission image data output unit 55. In a case of the photon detection type, as surrounded and shown by a broken line in FIG. 2, the outputs are connected to the transmission image data output unit 55 via a wave peak value detection units $52_1$ to $52_N$ that detect the wave peak value of the X-ray detection signal, region determination units $53_1$ to $53_N$ that determine each X-ray energy region detected based on the wave peak value detected by the wave peak value detection units $52_1$ to $52_N$, and region-by-region accumulation units $54_1$ to $54_N$ that perform processing for accumulating the signal values during the same one scan time (main scanning period) while incorporating the signal values for each energy region of the X-ray detection signal in accordance with determination results of the region determination units $53_1$ to $53_N$ in a predetermined calculation period.

This detection data output unit 31 sequentially acquires the detection data including information on a two-dimensional position determined in a direction Db which is the transport direction of the inspection object article W and the Direction Da in which the X-ray detection elements $22_1$ to $22_N$ are aligned, and the data equivalent to an image density value corresponding to a signal charge of the detection signal at each position, at a predetermined scanning period, and stores the detection data in an image memory or the like which enables first-in and first-out. In this manner, the detection data which can generate the X-ray transmission image of the inspection object article W can be output to a control block 32 side at a predetermined transfer rate.

Here, the irradiation intensity of the X-ray from the X-ray generator 21 and the period of the main scanning of the plurality of X-ray detection elements $22_1$ to $22_N$ of the X-ray detector 22 are set to values inherent to the present apparatus, and the transport speed and other inspection conditions of the article transport unit 10 are set in accordance with article type information of the inspection object article when the article type is set in advance.

The article type control unit 33 has a function of storing article type setting information which is set and registered in advance for each article type of the inspection object article W in a memory, and variably setting various parameters relating to the inspection condition, based on the article type setting information (for example, an article type number, an article name, the number of contents, a weight, a shape, a tube current, a tube voltage, a transport speed, a determination threshold value, a mask processing condition, and the like), and controlling the article transport unit 10, the X-ray inspection unit 20, the control unit 30, and the display operation unit 40 in accordance with the article type to have requested operation conditions.

In addition, the article type control unit 33 has a function as the specific inspection condition detection means for specifying the inspection condition, based on the inspection condition and other detection information which are based on the setting information of the article type, when the article type is selected by a selection operation from the display operation unit 40, and detecting in advance that the specific inspection condition which deteriorates the image quality of the inspection image generated by the image generation unit 34 is established, for example, that the transport speed of the inspection object article W passing through the inspection region Zx on the transport path 11a reaches or exceeds a predetermined speed, or that the X-ray transmittance of the inspection object article W in a transmission direction of the X-ray is within a low transmittance range in a plurality of transmittance ranges set in advance.

For example, the specific inspection condition referred to here is a condition that the irradiation intensity of the X-ray from the X-ray generator 21 with respect to the inspection object article W is insufficient or that the irradiation time of the X-ray is insufficient. The adjustment performed by the image data adjustment means when the specific inspection condition is established corresponds to processing for functionally adjusting brightness of the image in accordance with the light exposure amount (which depends on irradiation time and irradiation intensity of the radiation) such as gain adjustment of the digital camera, and can be the binning processing or the kernel filtering (filter processing), for example. The X-ray detector is not limited to a detector having one row in which the detection element rows of the radiation are aligned in the main scanning direction, and may be a detector having a plurality of rows which are aligned in the main scanning direction while being adjacent to each other in the sub-scanning direction (for example, an X-ray TDI camera method).

The image generation unit 34 generates an image of the inspection image including a plurality of pixels having each density value, based on each detection data output from the detection data output unit 31 in response to the detection signals from the plurality of X-ray detection elements $22_1$ to $22_N$ for each main scanning of the X-ray detector 22 with regard to the inspection object article W.

The inspection processing unit 35 performs the inspection processing for a predetermined article inspection for inspecting a predetermined quality state of the inspection object article W, based on the data of the inspection image of the inspection object article W. For example, the inspection processing of the predetermined article inspection referred to here has a function of performing image processing suitable for determination processing or visual confirmation work (more specifically, for example, image processing for setting a density gradient level, based on a result of a logarithmic conversion from a detection signal level in accordance with sensitivity of a human eye, processing for emphasizing and clearly showing a sudden change in an image density value in the vicinity of a contour of the foreign substance, processing for detecting edge or a line corresponding to a contour of the foreign substance or a standard content, and the like) in order to automatically and/or visually determine whether or not the foreign substance is contained in or a defect is present in the inspection object article W with the X-ray. As a matter of course, the inspection processing unit 35 may have a function of performing image processing suitable for a mass inspection, an inspection of the shape such as the thickness and the length of the inspection object article, detection of a packaging defect such as the content bitten into the sealing portion, or the like, instead of the inspection image processing for the foreign substance detection or the defect inspection, in accordance with the contents of the required article inspection.

The determination unit 36 executes a known predetermined determination processing program using main parameters for specifying a determination condition of the article inspection for each article type, for example, a foreign substance detection limit, a foreign substance area ratio, a density limit, or the like, based on the image data of the inspection object article W subjected to the image processing by the inspection processing unit 35, and determines whether or not the quality state of the inspection object article W is qualified. For example, the determination unit 36 performs the image processing suitable for determination processing on the inspection image, thereafter, determines whether or not the metal foreign substance or the like having a high X-ray absorption rate is contained by comparing the X-ray absorption rate with a predetermined threshold value, and sequentially outputs the determination results to a touch panel screen of the display operation unit 40.

The deterioration detection unit 37 has a deterioration detection function of detecting a predetermined deterioration state relating to the X-ray generator 21 and the X-ray detector 22, and supplies deterioration detection information to the article type control unit 33 which is the specific inspection condition detection means, as the detection information. That is, the deterioration detection unit 37 combinedly has a function as the specific inspection condition detection means for specifying the inspection condition based on the inspection condition and other detection information which are based on the article type setting information, when the article type is selected, in cooperation with the article type control unit 33, and detecting in advance, when the article type is selected, that the specific inspection condition which deteriorates the image quality of the inspection image generated by the image generation unit 34 is established.

Although details are not shown, the X-ray generator 21 combinedly has first and second measurement power supply circuits 27 and 28 that can be switched to a vacuum degree measurement mode by the control unit 30 and can operate the X-ray tube 23 as a vacuum degree meter when the vacuum degree measurement mode is selected. The first measurement power supply circuit 27 applies a positive potential corresponding to a predetermined measurement time voltage to the converging electrode of the X-ray tube 23, and applies a lighting voltage for providing thermionic emission energy to the filament on the cathode side. In addition, the second measurement power supply circuit 28 applies a positive potential corresponding to a predetermined measurement time voltage to the anode.

The deterioration detection unit 37 of the control unit 30 can estimate and calculate a vacuum degree of the temporally deteriorating X-ray tube 23 by being operated when the above-described vacuum degree measurement mode is selected, and has a function of estimating and calculating a remaining lifetime or a degree of deterioration of the X-ray tube 23, based on a calculation value of the vacuum degree. The function of estimating and calculating the remaining lifetime of the X-ray tube 23 based on the vacuum degree measurement and the vacuum degree measurement result is the same function as the function disclosed in WO2019/117172 as an X-ray generation device using a principle of an ionization vacuum gauge, for example, and from the remaining lifetime, the function can determine whether or not the X-ray irradiation intensity decreases to be lower than a predetermined intensity due to the temporal deterioration of the X-ray tube 23, and reaches to an extent that the deterioration of the image quality of the inspection image can be induced.

In addition, in addition to the plurality of X-ray detection elements $22_1$ to $22_N$, the X-ray detector 22 is provided with an X-ray detection element (not shown) located outside a range in the vicinity of the range of the main scanning of the X-ray detector 22, a signal detection circuit thereof (A/D conversion unit, wave peak detection unit, region determination unit, and region-by-region accumulation unit), and an attachable/detachable X-ray shielding cover that covers the X-ray detection element for detecting the deterioration (each is not shown). The X-ray detector 22 can detect the deterioration of the detection sensitivity by performing signal level comparison between the detection signal of the plurality of X-ray detection elements $22_1$ to $22_N$ and the detection signal of the X-ray detection element for detecting the deterioration for each predetermined period for detecting the deterioration. That is, the deterioration detection unit 37 has a function as the sensitivity decrease detection means for detecting a significant decrease state of the detection sensitivity of the X-ray detector 22, and this function of the sensitivity decrease detection means can be obtained by the same sensor configuration as that disclosed in JP-A-2002-168806, for example.

Therefore, when the irradiation intensity of the X-ray emitted from the X-ray generator 21 to the inspection object article W decreases to be lower than the predetermined intensity, the deterioration detection unit 37 can detect that the specific inspection condition is established by the deterioration state, and when the significant decrease state of the detection sensitivity of the X-ray detector 22 is detected, the deterioration detection unit 37 can detect that the specific inspection condition is established by the deterioration state.

That is, the specific inspection condition referred to here includes a condition that the transport speed of the inspection object article passing through the inspection region Zx on the transport path 11a reaches or exceeds the predetermined speed, or the irradiation intensity of the X-ray emitted from the X-ray generator 21 to the inspection object article W decreases to be lower than the predetermined intensity, or a condition that the transmittance of the inspection object article W in the transmission direction of the X-ray is within the low transmittance range in the plurality of transmittance ranges set in advance, or the significant decrease state in the detection sensitivity of the X-ray detector 22 is detected.

The level conversion processing unit 32 is image data adjustment means for adjusting the detection data output from the detection data output unit 31 to improve the image quality of the inspection image generated by the image generation unit 34, when the establishment of the specific inspection condition is detected by the article type control unit 33 and the deterioration detection unit 37. The adjustment to improve the image quality of the inspection image typically includes performing processing for improving a value of a signal-to-noise ratio (S/N) of the detection data such that a range (dynamic range) of the density value of the inspection image can be expanded. However, the adjustment may be processing for reducing noise components.

Specifically, the above-described specific inspection condition is set in stages to be the specific inspection condition when any one of a first specific transport condition and a second specific transport condition is established. The first specific transport condition is equal to or higher than a first transport speed (for example, 40 m/min shown in FIG. 4) equal to a predetermined speed at which the transport speed of the inspection object article W passing through the inspection region Zx on the transport path 11a of the article transport unit 10 is relatively higher than a normal transport speed in the same article type, and is lower than the second transport speed (for example, 90 m/min shown in FIG. 4) which is the higher transport speed than the first transport speed. The second specific transport condition is a high transport speed region equal to or higher than the second transport speed.

The level conversion processing unit 32 has a processing function of adjusting the detection data of the inspection object article W such that the adjustment amount of the detection data of the inspection object article W increases when setting the second specific transport condition is detected by the article type control unit 33 and/or the deterioration detection unit 37, compared to when setting the first specific transport condition is detected by the article type control unit 33 and/or the deterioration detection unit 37.

Figure 3:
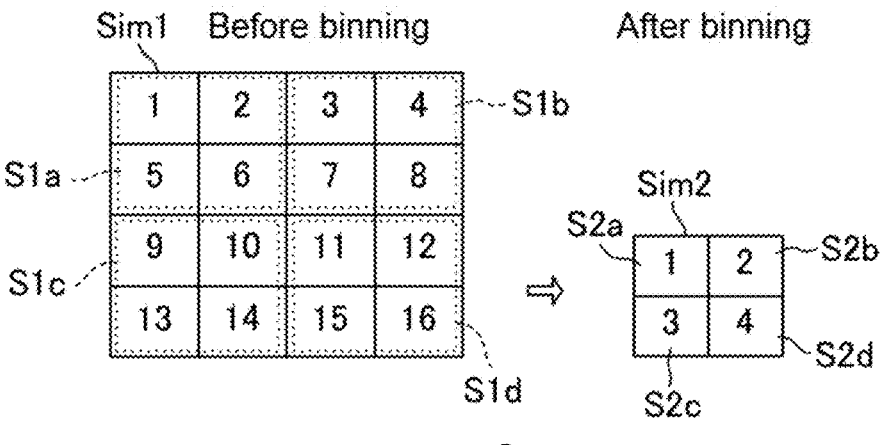
FIG. 3 is a view for describing binning processing for X-ray image data output as a detection signal from an X-ray detector and acquired by a detection data output unit in the article inspection apparatus according to the first embodiment of the present invention.

Specifically, as shown in FIG. 3, when the X-ray images of the inspection object article W can be partially or entirely generated by the detection data output from the detection data output unit 31, and a certain segment image Sim1 corresponding to a predetermined number of adjacent pixel groups in the X-ray image is obtained, the level conversion processing unit 32 performs predetermined binning processing in accordance with the detection information of the article type control unit 33 and/or the deterioration detection unit 37 which serve as the specific inspection condition detection means.

That is, when a segment image Sim1 is divided into a plurality of subsegment regions S1a, S1b, S1c, and S1d (small regions) by bin division, the level conversion processing unit 32 performs the binning processing for using the plurality of pixel values (in FIG. 3, for example, pixel values inside an upper left subsegment region S1a in a segment image Sim1 before the binning are shown by being substituted with "1", "2", "5", and "6" representing each pixel position) corresponding to the density values (charges of the detection signals) inside each small region, as processing units, and integrating the plurality of pixel values into the pixel value corresponding to one density value for each processing (in FIG. 3, for example, the upper left pixel value on the segment image Sim2 subjected to the binning is shown by being substituted with "1" representing the pixel position). In this manner, the level conversion processing unit 32 has a function of improving the signal-to-noise ratio (S/N) and increasing an image processing speed by reducing a size of the inspection image while adjusting the pixel value data corresponding to the density value of the X-ray image data of the inspection object article W to a side for improving the image quality of the inspection image.

The binning processing here may be processing for integrating the plurality of pixel values corresponding to the plurality of density values inside each small region subjected to the bin division into one added pixel value, or may be processing for integrating the plurality of pixel values into one average pixel value. In the former case, the same advantageous effect as the advantageous effect of improving the signal-to-noise ratio by increasing the signal level of the detection signal of the X-ray detector 22 is obtained, and in the latter case, the same advantageous effect as the advantageous effect of improving the signal-to-noise ratio by reducing the noise components is obtained.

Here, the processing for adjusting the detection data is described as the binning processing which is a suitable example, but the kernel filtering (filter processing with a predetermined kernel size) for density conversion or the like which can contribute to the improvement of the signal-to-noise ratio (S/N) such as expanding the dynamic range of the density value of the inspection image can also be performed.

In addition, as shown in FIG. 4, when the article type control unit 33 detects that the first specific transport condition is set from the setting value of the transport speed included in the article type information of the inspection object article W by the article transport unit 10, the level conversion processing unit 32 sets a bin division size to 2×2, and when the article type control unit 33 detects that the second specific transport condition is set, the level conversion processing unit 32 sets the bin division size to 4×4, and performs the binning processing for providing respectively different adjustment amounts.

Therefore, the level conversion processing unit 32 performs the binning processing in each specific transport condition such that the adjustment amount for adjusting the image data of the inspection object article W obtained by the detection data from the detection data output unit 31 increases when the article type control unit 33 detects that the second specific transport condition is set, compared to the adjustment amount for adjusting the image data when the article type control unit 33 detects that the first specific transport condition is set.

In addition, as shown in FIG. 4, when the transport speed of the inspection object article W passing through the inspection region Zx on the transport path 11a of the article transport unit 10 is in a normal transport speed range in the same article type, for example, lower than 40 m/min as shown in FIG. 4, and the article type control unit 33 does not detect that the specific inspection condition is established, the level conversion processing unit 32 sets the bin division size to 1×1, and does not perform the binning processing.

Furthermore, in addition to the data adjustment of the level conversion processing unit 32 as described above, as shown in FIG. 4, the article type control unit 33 controls the tube voltage of the X-ray tube 23 under the X-ray irradiation condition of the X-ray generator 21 to have a different voltage value, when the transport speed of the inspection object article W passing through the inspection region Zx on the transport path 11a of the article transport unit 10 is on a low-speed side (10 to 19 (m/min) in the drawing) in the normal transport speed range in the same article type, and when the transport speed is on a high-speed side (20 to 39 (m/min) in the drawing) in the normal transport speed range.

In addition, even when it is determined that the specific inspection condition is established, in any case when the first specific transport condition is set such that the transport speed of the inspection object article W passing through the inspection region Zx on the transport path 11a of the article transport unit 10 is equal to or higher than the first transport speed (for example, 40 m/min) and is lower than the second transport speed (for example, 90 m/min) and when the second specific transport condition which is equal to or higher than the second transport speed is set, the setting condition of the tube voltage of the X-ray tube 23 is the same. The article type control unit 33 controls the tube voltage of the X-ray tube 23 under the X-ray irradiation condition of the X-ray generator 21 to have the different voltage value in the drawing, when the setting condition of the tube voltage of the X-ray tube 23 is in a low-speed side (40 to 49 (m/min) or 90 to 99 (m/min) in FIG. 4) of the speed range of each of the specific transport conditions, or when the setting condition of the tube voltage of the X-ray tube 23 is in a high-speed side (50 to 89 (m/min) or 100 (m/min) or higher in FIG. 4) of the speed range in each of the specific transport conditions.

That is, the article type control unit 33 controls the tube voltage of the X-ray tube 23 to have a voltage value different from that in other transport speed ranges, in the specific transport speed range before switching or after the switching between the first specific transport condition and the second specific transport condition.

Furthermore, in the present embodiment, the level conversion processing unit 32 and the article type control unit 33 cause the detection data output unit 31 to acquire the image data of the inspection object article W by using a sample of the inspection object article W through the inspection region Zx on the transport path 11a when the article type is set, and calculate the transmittance of the inspection object article W, based on the image density ratio inside and outside the image region of the inspection object article W in the image data.

For example, when the article type control unit 33 estimates that the transmittance is within a specific transmittance range, for example, a low transmittance range in a plurality of stages of transmittance ranges set in advance, from thickness or material information of the inspection object article W, based on the article type information of the inspection object article W, the tube voltage of the X-ray tube 23 of the X-ray generator 21 is automatically variably set in accordance with the transmittance.

In this case, when the tube voltage becomes higher, the X-ray generator 21 can emit the X-ray having a relatively short wavelength and relatively strong transmission power, and when the tube voltage becomes lower, the X-ray generator 21 can emit the X-ray having a relatively long wavelength and relatively weak transmission power.

Therefore, the level conversion processing unit 32 and the article type control unit 33 have a function of not only reducing the inspection image size while adjusting the pixel value data corresponding to the density value of the X-ray image data of the inspection object article W to the side for improving the image quality of the inspection image by the binning processing in the level conversion processing unit 32 by variably setting the tube voltage of the X-ray tube 23 which is the X-ray irradiation condition of the X-ray generator 21, but also improving the signal-to-noise ratio (S/N) by variably setting the tube voltage of the X-ray tube 23.

The display operation unit 40 includes a flat panel display that can input request information to the control unit 30 in response to an operation input or can display an article type list or article type setting information set and stored in the article type control unit 33 on a screen.

Next, operations will be described.

Figure 5:
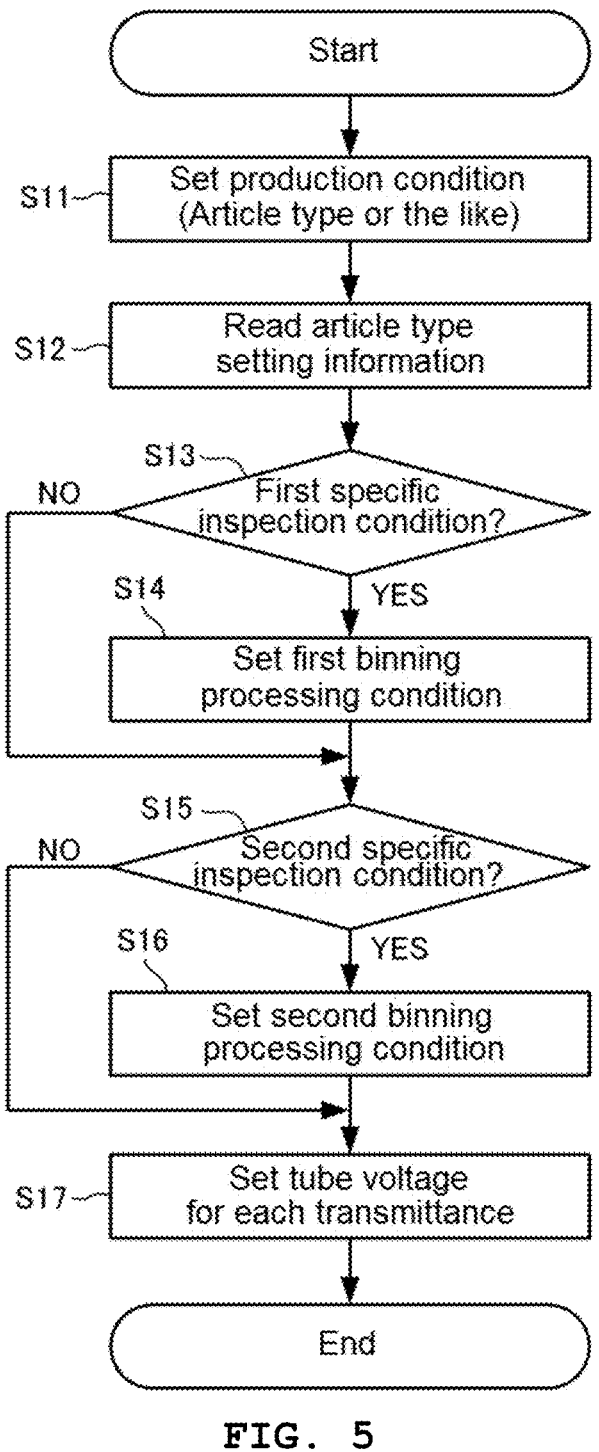
FIG. 5 is a flowchart showing a procedure of setting the binning processing condition and setting the tube voltage which correspond to the transport speed of the inspection object article, other article type setting information, and the like in the article inspection apparatus according to the first embodiment of the present invention.
Figure 6:
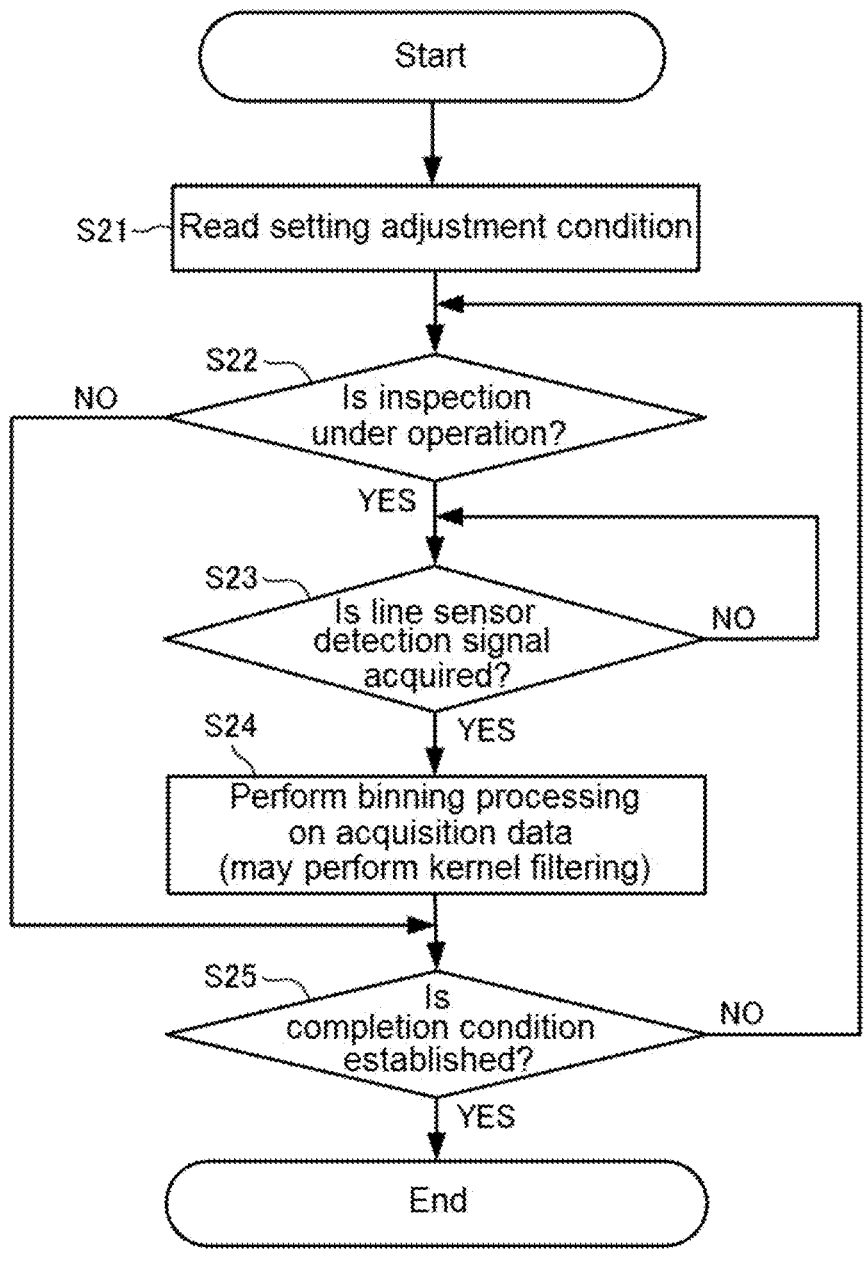
FIG. 6 is a flowchart showing a procedure of binning processing for the X-ray image data acquired by the detection data output unit in the article inspection apparatus according to the first embodiment of the present invention.

FIG. 5 is a flowchart showing a procedure of various setting processing performed in the article inspection apparatus 1 according to the present embodiment configured as described above, and FIG. 6 is a flowchart showing a processing procedure of adding the adjustment for suppress-ing the deterioration in the image quality with respect to the detection data of the X-ray transmission image in accordance with the inspection condition during the article inspection.

In the article inspection apparatus 1 according to the present embodiment configured as described above, when the inspection object article W having a new article type is registered, first, a production condition and the article type are selected and set, and the article type number, the article name, the number of contents, the weight, the shape, and the like which are the information on the inspection object article W of the article type are set and input (Steps S11 and S12 in FIG. 5).

In addition, a driving condition of the X-ray tube 23 of the X-ray inspection unit 20, that is, the tube voltage for specifying the irradiation intensity and a tube current for specifying the irradiation X-ray dose are set to appropriate initial setting levels. The detection sensitivity of the X-ray detector 22 is adjusted such that the X-ray transmission amount in each transmission region on only a belt surface in the entire region in the width direction on the transport path 11a without transport operation has an equal value. Next, the detection condition is set such that the belt surface of the transport path 11a of the article transport unit 10 without transport operation is set as a reference surface having no inspection object article, and a noise cut threshold value or the like of the X-ray image data to be incorporated into the detection data output unit 31 is set.

Furthermore, the sample of the inspection object article W is used, and the transport speed of the transport path 11a of the article transport unit 10, a threshold value, other parameters, or the like relating to the determination in the determination unit 36 are set in detail. For example, the initial setting data input under these settings is written in the article type control unit 33 as an article type parameter file, and is held in a state where the article type parameter file can be read out when there is an input to designate the article type.

When required setting processing is completed, a control program of a series of inspections is subsequently performed. For example, when an article type selection screen is displayed on a touch panel of the display operation unit 40 and there is an input to designate the article type of the inspection object article W as an inspection object, the setting information set in advance is read out from the article type parameter file inside the article type control unit 33, and subsequently, when there is an operation input of a start button or the like for instructing measurement start, the transport path 11a of the article transport unit 10 starts to transport the inspection object article W.

Therefore, the operation condition of the article inspection apparatus 1 in this case is a condition for inspecting a predetermined quality state under the detection condition and the determination condition which are set in advance for the selected article type.

Next, when the inspection object article W is loaded on an upstream side of the transport path 11a of the article transport unit 10, the inspection object article W is detected by an article detection sensor (not shown) before the inspection object article W is transported onto the transport path 11a or while the inspection object article W is transported.

Next, the line scanning of the X-ray detector 22 is repeated while the inspection object article W passes through the inside of the predetermined inspection region Zx, based on the length in the transport direction of the inspection object article W detected by the article detection sensor or the article detection period set in advance, and the detection signal of each of the plurality of X-ray detection elements $22_1$ to $22_N$ is incorporated into the detection data output unit 31 for each line scanning. Furthermore, when the data of the transmission amount of the N number of detection elements of the X-ray detector 22 is sequentially stored in the image memory inside the detection data output unit 31 and the above-described A/D conversion and other processing are performed, the data of the X-ray image corresponding to the X-ray transmission amount distribution for each inspection object article W is generated, and is output to the image generation unit 34 side that generates the inspection image as the detection data from the detection data output unit 31.

In the image generation unit 34, the inspection image is generated, based on the detection data from the detection data output unit 31 side, the inspection image is sent to the inspection processing unit 35, and the inspection processing performs the inspection processing relating to the predetermined article inspection, based on the data of the inspection image.

In the present embodiment, before the article inspection, when the article type control unit 33 and/or the deterioration detection unit 37 detect in advance that the specific inspection condition, that is, the inspection condition which deteriorates the image quality of the inspection image generated by the image generation unit 34 is established, the data adjustment is performed by improving the image quality of the inspection image by the binning processing or the kernel filtering described above in the level conversion processing unit 32 provided between the detection data output unit 31 and the image generation unit 34 for the detection data output from the detection data output unit 31.

That is, first, the article type control unit 33 determines whether or not a first specific inspection condition is established (Step S13), and in this case, when the first specific inspection condition is established (in a case of YES in Step S13), a first binning processing condition of the bin division size of 2×2 is set (Step S14).

On the other hand, in this case, when the first specific inspection condition is not established (NO in Step S13), it is determined whether or not a second specific inspection condition is established (Step S15), and in this case, when the second specific inspection condition is established (YES in Step S5), the second binning processing condition of the bin division size of 4×4 is set (Step S16).

When neither the first specific inspection condition nor the second specific inspection condition is established in the above-described determination processing, the bin division size is set to 1×1, and the binning processing is not set.

Next, in the normal inspection condition which is the normal transport speed range, or in any of the first specific inspection condition and the second specific inspection condition, the tube voltage [kV] for each transmittance is set to be each setting value shown in FIG. 4, depending on whether the condition is on the low-speed side or the high-speed side inside the speed range subjected to the same bin division (Step S17).

Next, when the article inspection is performed, first, the data adjustment condition set as described above is read by the level conversion processing unit 32 of the control unit 30 (Step S21), and thereafter, it is checked whether or not the inspection is under the operation (Step S22). When the inspection is under the operation (when YES in Step S22), subsequently, it is determined whether or not the line sensor detection signal is incorporated into the detection data output unit 31 by the main scanning of the X-ray detector 22, and the binning processing corresponding to the inspection condition for the acquisition data is performed after waiting for the acquisition of the detection data (Step S24).

On the other hand, when the inspection is not under the operation (in a case of NO in Step S22), subsequently, it is determined whether or not a predetermined completion condition (for example, whether or not the condition reaches a production scheduled quantity or another completion request occurs) is established (Step $25). When the predetermined completion condition is established (in a case of YES in Step S25), the current processing is completed.

On the other hand, when the predetermined completion condition is not established (in a case of NO in Step S25), the processing returns to the determination step (S22) of determining whether or not the inspection is under the operation.

In this way, the adjusted detection data for which the required data adjustment corresponding to the detection condition is performed by the level conversion processing unit 32 is incorporated into the image generation unit 34, and the image generation unit 34 generates the inspection image in which the inspection image which can improve the signal-to-noise ratio, for example, the range (dynamic range) of the density values of the plurality of pixels is expanded, based on the adjusted detection data adjusted by the level conversion processing unit 32. Therefore, the inspection processing unit 35 can perform the inspection processing relating to the predetermined article inspection, based on the data of the inspection image in which the range of the density values is expanded.

As a result, in the article inspection apparatus 1, even when the article transport speed in the article transport unit 10 needs to increase or the output of the X-ray generator 21 needs to be reduced, satisfactory article inspection processing can be performed while effectively suppressing the influence of the decrease in the signal level of the detection signal incorporated into the detection data output unit 31 from the line sensor type X-ray detector 22 for each predetermined main scanning period.

In addition, in the present embodiment, the detection data from the detection data output unit 31 is the X-ray image data having the density value based on the detection signal for each of the plurality of pixels of the X-ray image, and the level conversion processing unit 32 which is the image data adjustment means performs the image processing for converting the pixel group of the predetermined number of adjacent pixels in the X-ray image into one pixel, for example, the binning processing or the kernel filtering. Therefore, the inspection image can have the required image quality. Therefore, the inspection processing of the satisfactory article inspection can be performed by ensuring the required image quality of the inspection image.

Furthermore, in the present embodiment, the specific inspection condition includes a condition that the transport speed of the inspection object article W passing through a predetermined section on the transport path 11a reaches or exceeds a predetermined speed, or that the irradiation intensity of the X-ray emitted from the X-ray generator 21 to the inspection object article W decreases to be lower than the predetermined intensity. Therefore, when the signal level of the detection signal incorporated into the detection data output unit 31 from the X-ray detector 22 for each predetermined scanning period is lowered since the transport speed enters a specific high-speed region or the irradiation intensity of the X-ray is reduced to be lower than the predetermined intensity, the detection data output from the detection data output unit 31 is adjusted to improve the image quality of the inspection image by the level conversion processing unit 32.

In addition, the specific inspection condition includes a condition that the transmittance of the inspection object article W is within the low transmittance range of the plurality of transmittance ranges set in advance in the X-ray transmission direction. Therefore, when the transmittance of the inspection object article W enters the low transmittance range, the detection data output from the detection data output unit 31 is adjusted to improve the image quality of the inspection image by the level conversion processing unit 32.

Furthermore, in the present embodiment, the article type control unit 33 combinedly has a function as the sensitivity decrease detection means for detecting the significant decrease state of the detection sensitivity of the radiation detection unit, and the specific inspection condition includes a condition that the significant decrease state in the detection sensitivity of the X-ray detector 22 is detected by the sensitivity decrease detection means. When the significant decrease state in the detection sensitivity of the X-ray detector 22 is detected, the detection data output from the detection data output unit 31 is adjusted to improve the image quality of the inspection image by the level conversion processing unit 32.

Therefore, in the present embodiment, the inspection processing of the satisfactory article inspection can be performed by ensuring the required image quality of the inspection image.

In addition, in the present embodiment, the specific inspection condition is established when any one of the first specific transport condition in which the transport speed of the inspection object article W is equal to or higher than the first transport speed equal to a predetermined speed and is lower than the second transport speed, and the second specific transport condition that is the high transport speed region which is equal to or higher than the second transport speed is established. The level conversion processing unit 32 adjusts the detection data of the inspection object article W such that the adjustment amount of the detection data of the inspection object article W increases when the article type control unit 33 (and/or the deterioration detection unit 37) detects that the second specific transport condition is set, compared to when it is detected that the first specific transport condition is set. Therefore, when any of the first and second specific transport conditions, that is, any of the plurality of specific transport conditions set in stages is established, the adjustment amount of the detection data of the inspection object article W is changed in accordance with a stage of the condition, and the decrease in the signal level of the detection signal in the high-speed transport region is more effectively suppressed.

Furthermore, in the present embodiment, as described above, the level conversion processing unit 32 adjusts the detection data of the inspection object article by performing the binning processing in which the image data of each small region is used as a unit, when the X-ray image of the inspection object article W is divided into the plurality of small regions. Therefore, image reduction that suppresses an information loss caused by pixel thinning can be performed. Therefore, even when the article transport speed needs to increase or the output of the X-ray generator needs to be reduced, satisfactory article inspection processing can be performed by effectively suppressing the influence of the decrease in the signal level of the detection signal incorporated into the detection data output unit from the X-ray detector.

In addition, in the present embodiment, the level conversion processing unit 32 has an automatic setting function of accurately calculating the transmittance of the inspection object article W, based on the image density ratio inside and outside the image region of the inspection object article W in the detection data, and variably setting the X-ray irradiation condition, for example, the tube voltage of the X-ray tube 23 that affects the transmission power (X-ray energy), in accordance with the calculation value of the transmittance, when the detection data output unit 31 acquires the detection data of the inspection object article W by causing the sample of the inspection object article to pass through the predetermined section on the transport path 11a. Therefore, even in a case of the inspection object article W whose X-ray transmittance is the low transmittance, the decrease in the signal level of the detection signal is more effectively suppressed.

In the present embodiment, as shown in FIG. 4, in the specific transport speed range before switching or after switching between the first specific transport condition and the second specific transport condition, the tube voltage of the X-ray tube 23 is controlled to have a different voltage value from that in the other transport speed ranges. Therefore, in the specific transport speed range before switching or after switching between the first specific transport condition and the second specific transport condition, the transmission power and the transmission amount of the X-ray can be adjusted by controlling the tube voltage of the X-ray tube 23, and the influence of the decrease in the signal level of the detection signal before and after switching the transport condition can be effectively suppressed.

In this way, in the present embodiment, it is possible to provide the article inspection apparatus 1 that can perform the satisfactory inspection by effectively suppressing the significant influence of the decrease in the detection signal level of the X-ray generator 21 in the high transport speed region and the like which is the specific inspection condition, while increasing the article transport speed in the article transport unit 10 and reducing the output of the X-ray generator 21.

In the present embodiment, the level conversion processing unit 32 which is the image data adjustment means is disposed separately from the X-ray detector 22 inside the control unit 30. However, as a matter of course, the level conversion processing unit 32 which is the image data adjustment means may be incorporated into the X-ray detector 22.

Second Embodiment

Figure 7:
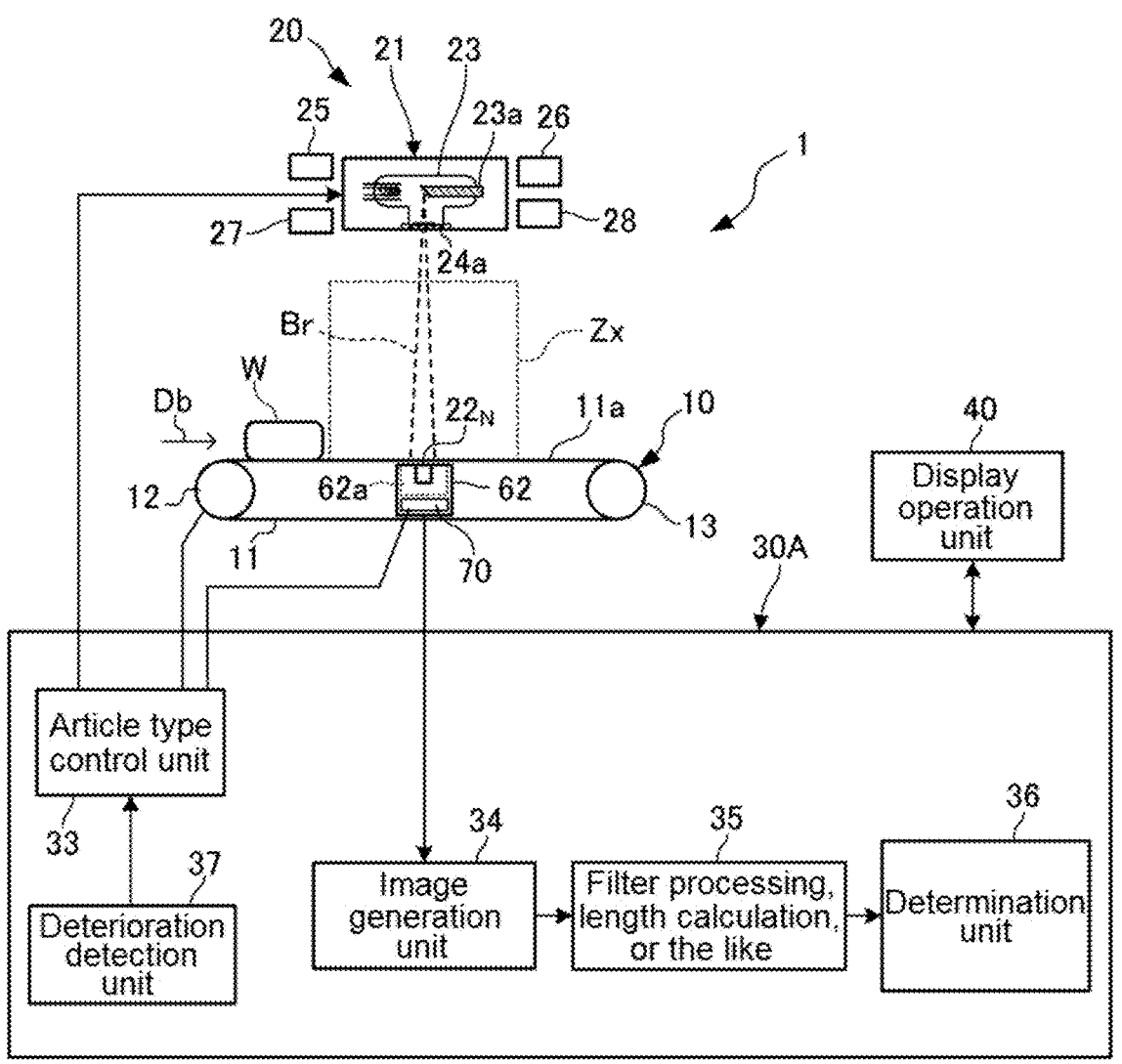
FIG. 7 is a schematic configuration diagram showing an article inspection apparatus according to a second embodiment of the present invention.

FIG. 7 is a view showing an article inspection apparatus according to a second embodiment of the present invention.

The present embodiment is different from the above-described first embodiment in that the present embodiment has a configuration in which the data processing function units corresponding to the detection data output unit 31 and the level conversion processing unit 32 in the first embodiment are incorporated in the X-ray detector without being provided inside the control unit 30. The other configurations are the same as those in the first embodiment. Therefore, hereinafter, points different from those in the first embodiment will be described.

In the article inspection apparatus 1 according to the present embodiment, the X-ray inspection unit 20 includes the X-ray generator 21 and the X-ray detector 62, and the X-ray detector 62 is an X-ray line sensor camera in which a data processing function unit 70 corresponding to the detection data output unit 31 and the level conversion processing unit 32 according to the first embodiment is integrally incorporated into a detector main body part 62a corresponding to the X-ray detector 22 according to the first embodiment.

In the present embodiment, the function of the detection data output unit 31 and the function of the level conversion processing unit 32 in the first embodiment can be fulfilled by the data processing function unit 70 incorporated in the X-ray detector 62. Therefore, a simple control unit 30A having a configuration excluding the detection data output unit 31 and the level conversion processing unit 32 which are the function units for data acquisition and preprocessing from the control unit 30 in the first embodiment can be adopted, and noise resistance in a stage of acquiring the transmission image data can be improved. Therefore, the satisfactory inspection can be performed by more effectively suppressing the significant influence of the decrease in the detection signal level of the X-ray generator 21 in the high transport speed region or the like which is the specific inspection condition.

In the present embodiment as well, it is possible to provide the article inspection apparatus that can perform the satisfactory inspection by effectively suppressing the significant influence of the decrease in the detection signal level of the X-ray generator in the high transport speed region or the like which is the specific inspection condition, while increasing the article transport speed in the article transport unit 10 and reducing the output of the X-ray generator 21.

Here, the radiation according to the present invention is used as the X-ray, but may be a photon beam or other radiation that transmits the article. In addition, the means for detecting the deterioration of the X-ray generator 21 or the X-ray detector 22 is not limited to the deterioration detection unit 37 described as an example. As a matter of course, a vacuum degree deterioration detection technology of another X-ray tube in the related art or a detection sensitivity decrease detection technology of the X-ray generator 21 can be applied.

As described above, the article inspection apparatus of the present invention can perform the satisfactory inspection by effectively suppressing the significant influence of the decrease in the detection signal level of the line sensor type X-ray detector in the high transport speed region or the like which is the specific inspection condition, while increasing the article transport speed and reducing the output of the X-ray generator. The present invention is useful for a general article inspection apparatus that acquires the image data corresponding to the dose distribution of the radiation transmitted through the transported article by performing the periodic detection operation of the line sensor type X-ray detector and determines the quality state of the inspection object article, based on the image data.

DESCRIPTION OF REFERENCE NUMERALS AND SIGNS

1: Article inspection apparatus
10: Article transport unit
11: Belt (conveyor belt)
11a: Transport path
12, 13: Roller
20: X-ray inspection unit
21: X-ray generator (radiation source, X-ray source, irradiation unit)
22: X-ray detector (radiation detection unit)

$22_1$ to $22_N$: Plurality of X-ray detection elements (detection elements)
23: X-ray tube
24a: X-ray window portion
23a: Anode
24: Housing body
25: One driving power supply circuit
26: Other driving power supply circuit
27: First measurement power supply circuit
28: Second measurement power supply circuit
30, 30A: Control unit
31: Detection data output unit
32: Level conversion processing unit (image data adjustment means)
33: Article type control unit (specific inspection condition detection means, sensitivity decrease detection means)
34: Image generation unit
35: Inspection processing unit (inspection image processing means)
36: Determination unit
37: Deterioration detection unit (specific inspection condition detection means)
40: Display operation unit
$51_1$ to $51_N$: A/D conversion unit
$52_1$ to $52_N$: Wave peak value detection unit
$53_1$ to $53_N$: Region determination unit
$54_1$ to $54_N$: Region-by-region accumulation unit
55: Transmission image data output unit
62: X-ray Detector
62a: Detector main body (radiation detection unit)
70: image processing function unit (detection data output unit, image data adjustment means)
Da: Main scanning direction (transport path width direction)
Db: Predetermined transport direction
W: Inspection object article
Zx: Inspection region (predetermined section)
What is claimed is:

1. An article inspection apparatus comprising:
an article transport unit having a transport path for transporting an inspection object article at a predetermined transport speed;
a radiation source that irradiates the inspection object article inside a predetermined section on the transport path with radiation;
a radiation detection unit having a plurality of detection elements facing the radiation source across the transport path, causing the plurality of detection elements to sequentially detect the radiation transmitted through the inspection object article, and outputting respective detection signals;
a detection data output unit that incorporates the respective detection signals from the radiation detection unit at a predetermined period, and that outputs detection data for generating a radiation image of the inspection object article;
an image generation unit that generates an inspection image including a plurality of pixels having respective density values, based on the detection data output from the detection data output unit;
specific inspection condition detection means for detecting that a specific inspection condition which deteriorates image quality of the inspection image is established;
image data adjustment means for adjusting the detection data output from the detection data output unit to improve the image quality of the inspection image, when the specific inspection condition detection means detects that the specific inspection condition is established; and an inspection processing unit that performs inspection processing for inspecting a predetermined quality state of the inspection object article, based on data of the inspection image of the inspection object article which is generated by the image generation unit.

2. The article inspection apparatus according to claim 1, wherein the detection data is radiation image data having a density value based on the respective detection signals for a plurality of pixels of the radiation image, and the image data adjustment means causes the inspection image to have required image quality by performing image processing for converting each pixel group of a predetermined number of adjacent pixels in the radiation image into one pixel.

3. The article inspection apparatus according to claim 1, wherein the specific inspection condition includes a condition that a transport speed of the inspection object article passing through a predetermined section on the transport path reaches or exceeds a predetermined speed, or a condition that an irradiation intensity of the radiation emitted from the radiation source to irradiate the inspection object article is reduced to be lower than a predetermined intensity.

4. The article inspection apparatus according to claim 2, wherein the specific inspection condition includes a condition that a transport speed of the inspection object article passing through a predetermined section on the transport path reaches or exceeds a predetermined speed, or a condition that an irradiation intensity of the radiation emitted from the radiation source to irradiated the inspection object article is reduced to be lower than a predetermined intensity.

5. The article inspection apparatus according to claim 1, wherein the specific inspection condition includes a condition that a transmittance of the inspection object article in a transmission direction of the radiation is within a low transmittance range of a plurality of transmittance ranges set in advance.

6. The article inspection apparatus according to claim 2, wherein the specific inspection condition includes a condition that a transmittance of the inspection object article in a transmission direction of the radiation is within a low transmittance range of a plurality of transmittance ranges set in advance.

7. The article inspection apparatus according to claim 1, further comprising:

sensitivity decrease detection means for detecting a significant decrease state of a detection sensitivity of the radiation detection unit, wherein the specific inspection condition includes a condition that the significant decrease state of the detection sensitivity is detected by the sensitivity decrease detection means.

8. The article inspection apparatus according to claim 2, further comprising:

sensitivity decrease detection means for detecting a significant decrease state of a detection sensitivity of the radiation detection unit, wherein the specific inspection condition includes a condition that the significant decrease state of the detection sensitivity is detected by the sensitivity decrease detection means.

9. The article inspection apparatus according to claim 2, wherein the specific inspection condition is established when any one of a first specific transport condition in which a transport speed of the inspection object article passing through a predetermined section on the transport path is equal to or higher than a first transport speed equal to a predetermined speed and is lower than a second transport speed higher than the first transport speed, and a second specific transport condition that is a high transport speed region which is equal to or higher than the second transport speed is established, and the image data adjustment means adjusts the detection data of the inspection object article such that an adjustment amount of the detection data of the inspection object article increases when the specific inspection condition detection means detects that the second specific transport condition is set, compared to when the specific inspection condition detection means detects that the first specific transport condition is set.

10. The article inspection apparatus according to claim 2, wherein the image data adjustment means adjusts the detection data of the inspection object article by performing binning processing in which image data of each small region is used as a unit, when an X-ray image of the inspection object article is divided into a plurality of small regions.

11. The article inspection apparatus according to claim 5, wherein the image data adjustment means has an automatic setting function of calculating the transmittance of the inspection object article, based on an image density ratio inside and outside an image region of the inspection object article in the detection data, and of performing variable setting on a radiation irradiation condition of the radiation source in accordance with a calculation value of the transmittance, when the detection data of the inspection object article is acquired by the detection data output unit.

12. The article inspection apparatus according to claim 6, wherein the image data adjustment means has an automatic setting function of calculating the transmittance of the inspection object article, based on an image density ratio inside and outside an image region of the inspection object article in the detection data, and of performing variable setting on a radiation irradiation condition of the radiation source in accordance with a calculation value of the transmittance, when the detection data of the inspection object article is acquired by the detection data output unit.

13. The article inspection apparatus according to claim 9, wherein the radiation source is an X-ray generator having an X-ray tube, and a tube voltage of the X-ray tube is controlled to a voltage value different from a voltage value in other transport speed ranges in a specific transport speed range before switching or after switching between the first specific transport condition and the second specific transport condition.

14. The article inspection apparatus according to claim 10, wherein the radiation source is an X-ray generator, and the article inspection apparatus further comprises an X-ray line sensor camera including the radiation detection unit, the detection data output unit, and an image processing circuit for performing the binning processing.

* * * * *